United States Patent
Klassen

(10) Patent No.: US 6,741,751 B1
(45) Date of Patent: May 25, 2004

(54) LOGIC BASED TAGGING FOR HYPERACUITY RENDERING OF AN INPUT IMAGE WITH A 5×5 CONTEXT

(75) Inventor: R. Victor Klassen, Webster, NY (US)

(73) Assignee: Xerox Corporation, Stamford, CT (US)

(*) Notice: Subject to any disclaimer, the term of this patent is extended or adjusted under 35 U.S.C. 154(b) by 512 days.

(21) Appl. No.: 09/641,315

(22) Filed: Aug. 18, 2000

(51) Int. Cl.[7] .................................................. G06K 9/40
(52) U.S. Cl. ........................ 382/266; 382/199; 382/299
(58) Field of Search ................................. 382/199, 205, 382/266, 269, 298, 299, 308, 162; 358/2.1, 3.15

(56) References Cited

U.S. PATENT DOCUMENTS

| | | | |
|---|---|---|---|
| 5,410,414 A | 4/1995 | Curry ........................ 358/298 |
| 5,485,289 A | 1/1996 | Curry ........................ 358/448 |
| 5,638,110 A | 6/1997 | Pierce et al. ............... 347/253 |
| 5,696,604 A | 12/1997 | Curry ........................ 358/459 |
| 5,719,967 A | * 2/1998 | Sekine ...................... 382/266 |
| 5,872,868 A | 2/1999 | Curry ........................ 382/266 |
| 6,167,166 A | * 12/2000 | Loce et al. ................. 382/266 |

OTHER PUBLICATIONS

"Document Compression Using Rate–Distortion Optimized Segmentation" article by Hui Cheng and Charles A. Bouman, School of Electrical and Computer Engineering, Purdue Univesity (Abstract only), Date of Publication prior to Jul. 22, 1999.

\* cited by examiner

*Primary Examiner*—Phuoc Tran
(74) *Attorney, Agent, or Firm*—Fay, Sharpe, Fagan, Minnich & McKee, LLP

(57) ABSTRACT

A primary pixel of interest within an image is processed by receiving colors, defining a plurality of pixels in a primary sub-neighborhood of pixels included within a neighborhood of pixels, into a processor. The primary pixel of interest is included within the primary sub-neighborhood. A determination is made if a border exists between first and second regions within the primary pixel of interest. If the border exists within the primary pixel of interest, a plurality of secondary sub-neighborhoods of pixels, which are included within the neighborhood and that potentially include the border, are determined. A determination is made if the border exists between the first and the second regions within respective secondary pixels of interest in the secondary sub-neighborhoods. If the border exists within a predetermined number of the pixels of interest, respective amounts of coverage for first and second colors are identified within a plurality of scaled up pixels corresponding to the primary pixel of interest. The scaled up pixels are displayed.

21 Claims, 6 Drawing Sheets

FIG. 5
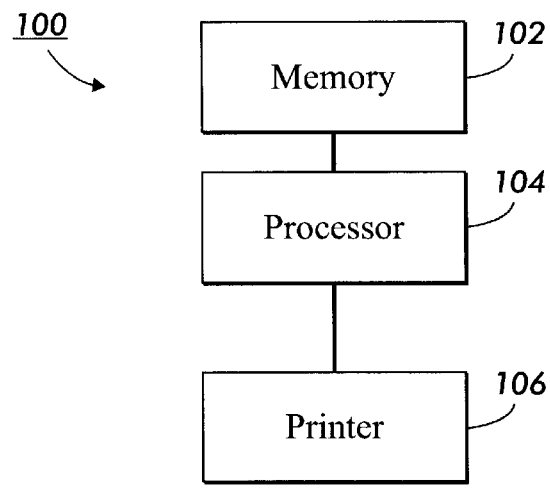
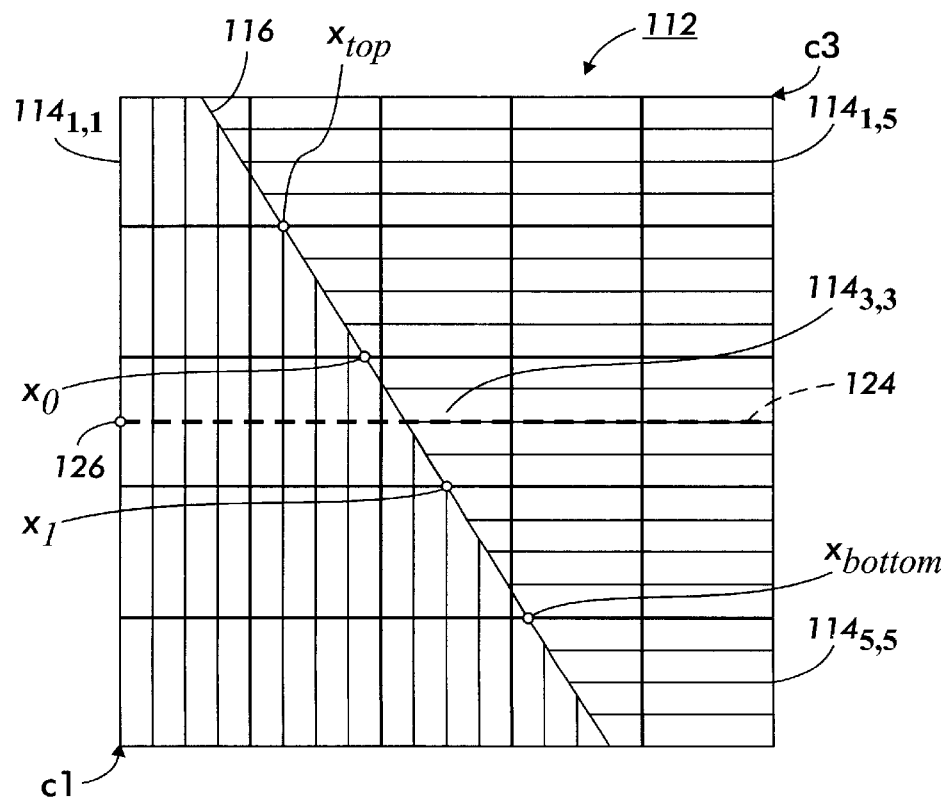
FIG. 6

FIG. 7A

| 116 | 240 | 255 | 255 | 255 |
|-----|-----|-----|-----|-----|
| 100 | 162 | 255 | 255 | 255 |
| 100 | 108 | 216 | 255 | 255 |
| 100 | 100 | 139 | 252 | 255 |
| 100 | 100 | 100 | 193 | 255 |

FIG. 7B

| 116 | 240 | 255 | 255 | 255 |
|-----|-----|-----|-----|-----|
| 100 | 162 | 255 | 255 | 255 |
| 100 | 108 | 216 | 255 | 255 |
| 100 | 100 | 139 | 252 | 255 |
| 100 | 100 | 100 | 193 | 255 |

FIG. 7C

| 116 | 240 | 255 | 255 | 255 |
|-----|-----|-----|-----|-----|
| 100 | 162 | 255 | 255 | 255 |
| 100 | 108 | 216 | 255 | 255 |
| 100 | 100 | 139 | 252 | 255 |
| 100 | 100 | 100 | 193 | 255 |

FIG. 9

| | | | |
|---|---|---|---|
| 255 | 255 | 255 | 255 |
| 100 | 255 | 255 | 255 |
| 100 | 255 | 255 | 255 |
| 100 | 100 | 255 | 255 |

$114_{3,3}$
$150_{1,1}$
$150_{4,1}$
$150_{4,4}$

LOGIC BASED TAGGING FOR HYPERACUITY RENDERING OF AN INPUT IMAGE WITH A 5×5 CONTEXT

BACKGROUND OF THE INVENTION

The present invention relates to scaling (i.e., enlarging or reducing) images. It finds particular application in conjunction with scaling antialiased original color images to prepare them for display on hard-copy or soft-copy and will be described with particular reference thereto. It will be appreciated, however, that the invention is also amenable to other like applications.

The use of graphics in computer and communication applications is very widespread and is becoming increasingly prevalent. A computing device often transmits a document including graphical data to a printing device using a page description language. Page description languages (e.g., the PostScript® language) include interpretive programming commands useful for implementing powerful graphics capabilities. When transmitted via a page description language, graphical data is typically converted into a raster image file. Printing devices then include electronics and software for making marks on paper corresponding to positions in the raster image file where the image values so indicate.

Page description language interpreters may include means for printing antialiased images. In the context of gray-scale raster data, antialiasing refers to introducing intermediate intensity levels along edges of the object for smoothing jagged lines in lower resolution images. Similarly, in the context of color raster data, antialiasing refers to introducing intermediate colors along the edges of objects to achieve the same effect in lower resolution color images.

In general, the cost of computing power necessary for manipulating data is at least proportional to the amount of data to be manipulated. Therefore, it is often cheaper to manipulate data for lower resolution images. When it becomes desirable to print the image stored using low-resolution data, the data must then be scaled up to a higher resolution. In this manner, a high-resolution image is produced using less computing power than would otherwise be required. Similarly, the image is transmitted using substantially less transmission bandwidth. For example, an image to be printed at 1000 square inches per minute, 600×4800 spots per inch, and 1 bit per pixel, if transmitted at full resolution, requires 48 M bits per second raw bandwidth. On the other hand under the same circumstances, if the image is computed at 400 spots per inch, antialiased to 8 bits per pixel, and transmitted before scaling, the total required bandwidth is only 21 M bits per second.

Scaling up a pixel of an image included within an area having a single, constant color is relatively simple. More specifically, each pixel within the area of constant color is replaced by a group of pixels having the same color.

Scaling up pixels along edges or other geometries, on the other hand, is relatively more complicated. FIG. 1 illustrates a portion of an antialiased image 10 having dark lines 12 that are approximately 2.5 pixels thick. The lines 12 in FIG. 1 are scaled up for improved visibility and are best viewed at approximately five (5) feet for receiving a correct subjective impression. FIG. 2 illustrates a magnified view 14 of the top, left portion of FIG. 1. The edge position 16 of FIG. 2 is represented by pixels having intermediate gray-levels. When the intermediate gray-levels are halftoned, as shown in FIG. 3, the resulting appearance 20 depends strongly on where the dot center is relative to the pixel. If the image is halftoned using a typical high-addressability scheme, in which each contone input pixel is replaced with a set of binary output pixels, some of the generated halftone dots 22 are disconnected from the line 24 (see FIG. 3). Several conventional algorithms (e.g., hyperacuity and tagged antialiased imaging) exist for scaling up pixels to be halftoned.

Hyperacuity seeks to improve image quality without increasing overall resolution. Information concerning the location of where edges are to be printed is maintained with a high degree of accuracy, but without increasing the resolution of the input data. A byte-map, instead of a bit-map, is used for the desired image of text (or lineart) to be printed. Each bit position is replaced with a multi-bit byte of coded information, such as a gray value or pixel. The information contained in these multi-bit gray pixels is processed with neighboring gray pixels within the hyperacuity printer to generate an identification of where the edges should be placed. This information, in turn, is used to adjust the exposure in the printer in an optimal manner in order to produce edges that do not have a stair stepping effect. Hyperacuity printing requires a preprocessing stage for deciding when to simply halftone the image and when to treat it as line art and interpolate an edge position.

Tagged antialiased imaging involves thresholding input data into various categories of brightness. Template matching is used to determine whether the thresholded data "looks" like an antialiased edge. The template matching approach tags pixels along the edge to indicate whether the edge is dark on the left, the right, or top/bottom. The halftone screen is changed in accordance with which of the four (4) cases occurs (i.e., left, right, top/bottom, or none). In the left and right cases, a high-frequency screen having darkness and lightness growing from one side of the screen is used. In the top/bottom case, the screen grows from the center.

Tagged antialiased imaging is based on an assumption that edges worth rendering as antialiased are only identified by intermediate color-levels. Furthermore, neither of the methods discussed above, is capable of determining whether an edge exists or an orientation of an edge when the edge divides two regions of color that are not full (or nearly) on and off. Therefore, this information must be supplied to the hyperacuity and tagged antialiased rendering algorithms.

One approach used for generating tags for hyperacuity and tagged antialiased rendering is to threshold the data so that pixels with one neighbor having more than one threshold and one having less than another threshold must be present. Having a threshold at which the rendering technique changes invariably leads to the possibility of artifacts. First, consider a 95% black line on a sweep from white to 50% gray. At some point in the sweep, the contrast drops to a point that the rendering technique changes, leading to an artifact at this point. Second, consider a pictorial image. Only very high contrast edges in such an image will retain an acceptable appearance if rendered as lineart, or tagged to use the high frequency halftone. If the threshold is too low, far too many pixels within an image fit the criterion and, therefore, use the high-frequency halftone. Even synthetic data may not switch smoothly between the methods. A line at certain angles may have pixels that appear to meet the criterion, whereas elsewhere on the same line there are pixels that do not. FIG. 3 illustrates that a variety of gray-levels result in such situations.

As illustrated in FIG. 4, a partial dotting 26 preserves an edge 28 when a "clean" edge is between first and second gray-levels 30, 32, respectively. Despite the fact that the edge 28 is not between black and white, it is preserved as well as can be achieved without changing the intensity along the edge 28. This results as a natural consequence of halftoning an edge between two gray levels if the edge is at the same resolution as the halftone dot.

Another conventional method for transforming a pixel from low-resolution to high-resolution looks at a window around the pixel. Patterns are identified within the pixels in the window. The patterns are compared to known samples at both 300 spots per inch ("spi") and 600 spi. There are several drawbacks with this method. For example, the original image may contain patterns that are not recognized. Furthermore, the patterns viewed at 300 spi may equally translate to two (2) different objects at 600 spi. Also, in order to be able to accurately identify patterns, the number of pixels within the window may need to be relatively large, which requires more memory. Furthermore, a relatively large look-up table, having significantly more gates, is required to store the different patterns. Another disadvantage of such a method as commonly practiced is that it involves the use of thresholding and, therefore, is not capable of handling edges between any two (2) gray-levels.

A previous scaling algorithm uses a 3×3 context and includes 1) determining whether an edge is present, 2) if an edge is present, determining an edge angle and intercept, and 3) replacing the pixel at the center using a lookup table if an edge is present, or interpolation if an edge is not present. More specifically, the 3×3 scaling algorithm classifies pixels as to whether they are edges or interiors and, consequently, whether they should be halftoned or provided with a high-definition edge.

The 3×3 classifier, which has been used with Hyperacuity, determines if an edge appears to pass through a center pixel of a 3×3 neighborhood. If an edge is found in the center pixel, the orientation and colors of the two (2) regions it separates are determined. A difference (dX) between sums of pixels in the first and last rows and a difference (dY) between the sums of the pixels in the first and last columns are calculated. Then, a determination is made whether an edge exists as a function of dX, dY, and the pixel colors.

The notion behind the 3×3 context scaling is that where a clean edge exists in antialiased input, the data may be interpreted to find the precise edge location and the two (2) colors that the edge separates. This process improves the rendition of text and synthetic graphics, but is best not applied in pictorials, unless they contain such clean edges. Therefore, because false edges may cause artifacts in pictorials, and because missed edges may result in halftoned portions of antialiased text and lineart, it is important to correctly classify pixels. The 3×3 scaling algorithm is relatively reliable for classifying edges in lines that are about 2 pixels or wider. However, lines that are less than about 2 pixels wide are sometimes misclassified, and edge patterns are not identified.

The present invention provides a new and improved apparatus and method which overcomes the above-referenced problems and others.

SUMMARY OF THE INVENTION

An apparatus for rendering an image includes a memory for storing display data associated with a primary neighborhood of pixels within the image. A processor, communicating with the memory, assigns tags to a pixel of interest within the primary neighborhood as a function of a plurality of edge detection analyses performed on the display data in respective sub-neighborhoods within the primary neighborhood. Each of the sub-neighborhoods includes the pixel of interest.

In accordance with one aspect of the invention, an output device, which communicates with the processor, displays the scaled up pixel of interest.

In accordance with a more limited aspect of the invention, the output device is a color printing device.

In accordance with another aspect of the invention, the processor scales up the pixel of interest within the primary neighborhood if a majority of the edge detection analyses determine that an edge is included within the respective sub-neighborhoods.

In accordance with a more limited aspect of the invention, the processor determines respective edge types in the sub-neighborhoods.

In accordance with an even more limited aspect of the invention, scaled up display data for the pixel of interest is calculated as a function of the display data associated with the sub-neighborhoods including the edge.

In accordance with another aspect of the invention, the scaled up display data for the pixel of interest is calculated as a function of a slope of the edge within the sub-neighborhood including the pixel of interest.

In accordance with another aspect of the invention, colors of the scaled up display data are determined as a function of colors within the sub-neighborhoods including the edge.

In accordance with another aspect of the invention, the primary neighborhood is a 5×5 neighborhood of pixels. Each of the sub-neighborhoods is a 3×3 neighborhood of pixels, and the processor performs 3 edge detection analyses.

In accordance with another aspect of the invention, the tags identify whether an edge, along with an associated orientation of the edge, is present within the pixel of interest.

One advantage of the present invention is that it is capable of classifying lines that are less than about 2 pixels wide for identifying edge patterns.

Another advantage of the present invention is that it is capable of handling edges between any two (2) gray-levels.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 5 illustrates a system according to the present invention;

FIG. 6 illustrates an edge within a neighborhood of pixels;

FIGS. 7A, 7B, and 7C illustrate a neighborhood of pixels;

FIG. 9 illustrates a scaled up version of the pixel of interest.

DETAILED DESCRIPTION OF THE PREFERRED EMBODIMENTS

Figure 1:
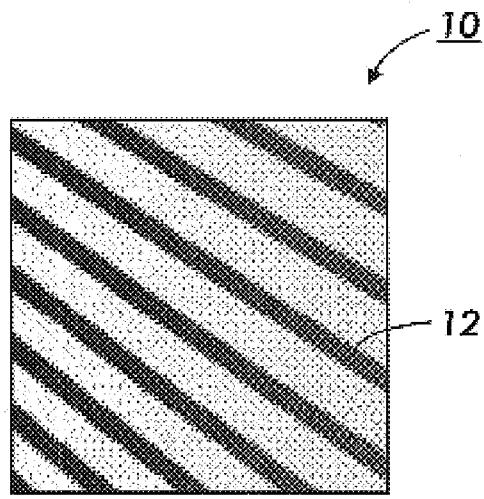
FIG. 1 illustrates a prior art antialiased image having dark lines that are approximately 2.5 pixels thick.
Figure 2:
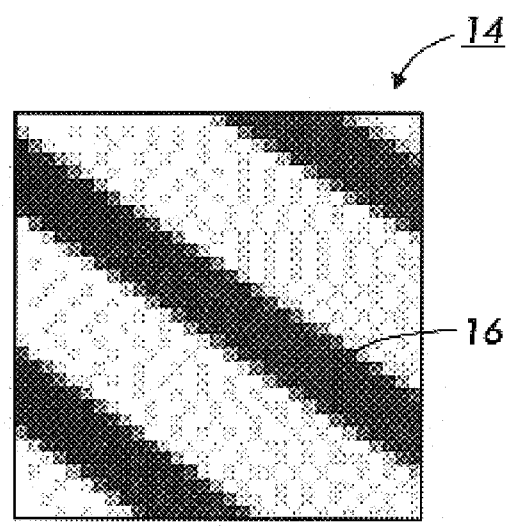
FIG. 2 illustrates a magnified view of the top, left portion of the prior art image shown in FIG. 1.
Figure 3:
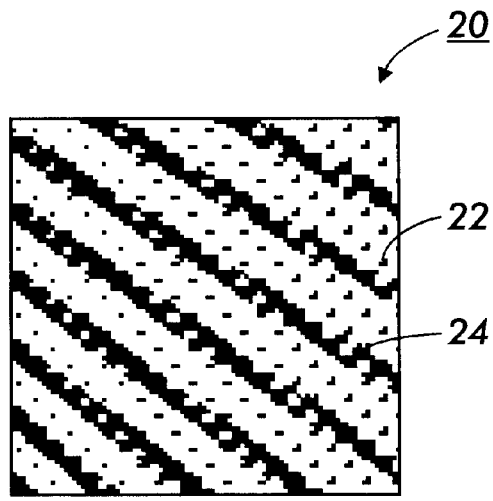
FIG. 3 illustrates the effect of conventional halftoning for the image shown in FIG. 1.
Figure 4:
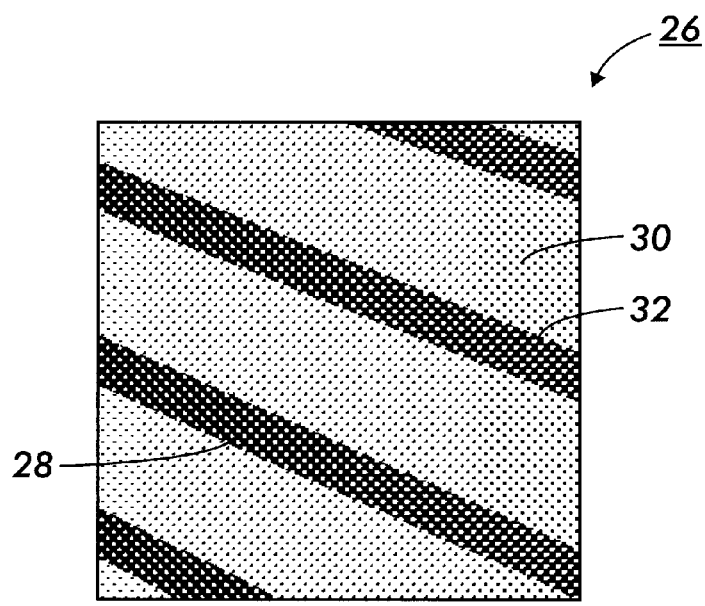
FIG. 4 illustrates the effect of conventional partial dotting when clean edges exist between two (2) gray levels.

FIG. 5 illustrates a system 100 for scaling up low-resolution data (e.g., pixels) from an original image, which has been antialiased. The low-resolution data for the antialiased image is stored in a memory 102. The memory 102 communicates with a processor 104, which in turn communicates with a high-addressability output device 106. In the preferred embodiment, the output device 106 is a color printer. However, it is also contemplated that the output device 106 be other devices (e.g., a gray-scale printer or a facsimile machine capable of producing either color or gray-scale output). The processor 104 receives the antialiased data from the memory 102, scales up the antialiased data, and transmits the high-resolution data to the high-addressability output device 106.

A process of scaling up the data transforms a single pixel of the low-resolution, antialiased data into a group of high-resolution pixels. FIG. 6 illustrates a 5×5 neighborhood 112, including twenty-five (25) low-resolution, antialiased pixels $114_{i,j}$, where i identifies a row and j identifies a column of a pixel 114 within the neighborhood 112. Since the neighborhood 112 includes twenty-five (25) pixels, i and j each ranges from 1 to 5. An initial pixel of interest ("POI") $114_{3,3}$, which is stored in the memory, is a center pixel within the 5×5 neighborhood 112. An edge 116, which is defined between a first color c1 and a second color c3 (i.e., between two regions), passes through the 5×5 neighborhood 112. FIG. 7A illustrates the steps used for scaling up the antialiased POI $114_{3,3}$. Preferably, the edge is less than about 2 pixels wide.

With reference to FIG. 7A, numerical values are assigned to the POI $114_{3,3}$ and the twenty-four (24) surrounding pixels 114. For example, a pixel completely covered by the first color c1 is assigned a value of 100 while a pixel completely covered by the second color c3 is assigned a value of 255. Pixels through which the edge 116 passes, and which are partially covered by both the first and second colors c1, c3, are assigned values based on the respective proportion of coverage of the first and second colors c1, c3.

Figure 8:
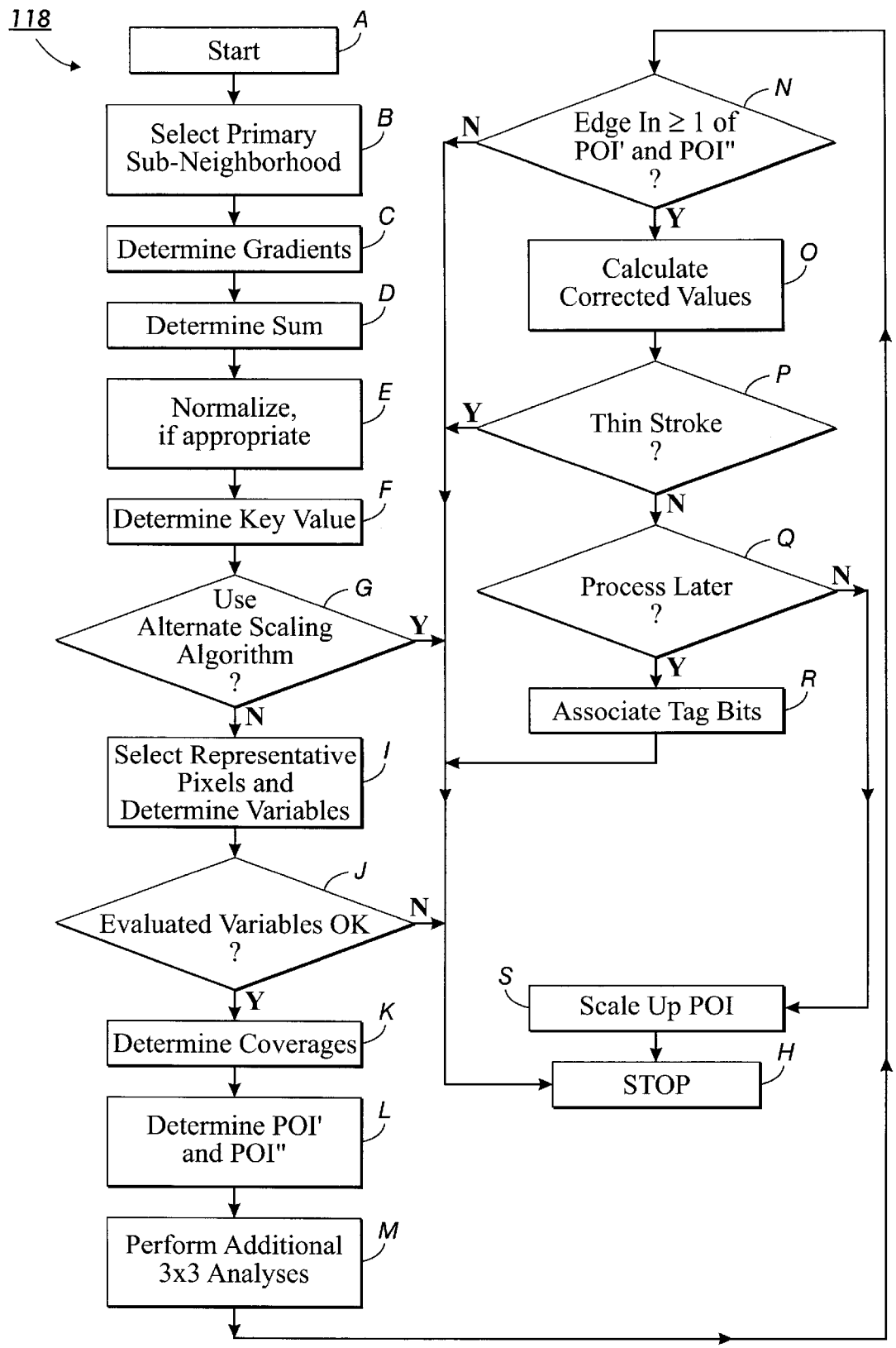
FIG. 8 illustrates a process for scaling up the neighborhood of pixels illustrated in FIGS. 7A, 7B, and 7C.

With reference to FIGS. 7A and 8, the process 118 for scaling up the POI $114_{3,3}$ starts at a step A. A primary sub-neighborhood 120 is selected in a step B. Preferably, the primary sub-neighborhood 120 is a 3×3 neighborhood centered around the POI $114_{3,3}$. Therefore, the pixels $114_{2,2}$, $114_{3,2}$, $114_{4,2}$, $114_{2,3}$, $114_{3,3}$, $114_{4,3}$, $114_{2,4}$, $114_{3,4}$, $114_{4,4}$ are selected as the primary sub-neighborhood 120 in the step B. To facilitate the explanation, the pixels $114_{2,2}$, $114_{3,2}$, $114_{4,2}$, $114_{2,3}$, $114_{4,3}$, $114_{2,4}$, $114_{3,4}$, $114_{4,4}$ within the sub-neighborhood 120 are identified as UL, ML, LL, UC, LC, UR, MR, LR, respectively, where UL identifies the upper, left pixel $114_{2,2}$ in the primary sub-neighborhood 120, ML identifies the middle, left pixel $114_{3,2}$, LL identifies the lower, left pixel $114_{4,2}$, UC identifies the upper, center pixel $114_{2,3}$, LC identifies the lower, center pixel $114_{4,3}$, UR identifies the upper, right pixel $114_{2,4}$, MR identifies the lower, right pixel $114_{3,4}$, and LR identifies the lower, right pixel $114_{4,4}$.

Respective local color gradients of the 3×3 neighborhood along an x-direction and a y-direction are calculated in a step C. In the example shown in FIG. 7A, a gradient along the x-direction dX is calculated as LL−UL+LR−UR=100−162+252−255=−65. Similarly, a gradient along the y-direction dY is calculated as UR−UL+LR−LL=255−162+252−100=245.

A sum of the absolute values of dX and dY is calculated as 310 in a step D. If the sum of the absolute values is very small (e.g., less than or equal to about 25% of the range of pixel values), the edge is not well enough defined to normalize the values of dX and dY. Therefore, if the sum of the absolute values of dX and dY is greater than about one-quarter (¼) of the range between the minimum and maximum pixel values, the values of dX and dY are normalized, in a step E, within a range including zero (0) and 255.

In the example described above, the minimum and maximum pixel values are 100 and 255, respectively. Therefore, one-quarter (¼) of the range between the minimum and maximum pixel values is 0.25*(255−100), or about 39. The sum of the absolute values of dX and dY is 310 (i.e., 245+65). Since the sum of the absolute values of dX and dY is greater than about one-quarter (¼) of the range between the minimum and maximum pixel values, the values of dX and dY are normalized, in the step E, within a range including zero (0) and 255. In the example described above, the value of dX is replaced by a normalized dX value, which is calculated as dX*255/(|dX|+|dY|)=−65*255/(65+245)=−53. Similarly, the value of dY is replaced by a normalized dY value, which is calculated as dY*255/(|dX|+|dY|)=245*255/(65+245)=202. Therefore, in the example described above, the final (normalized) values of dX and dY are −53 and 202, respectively.

In alternate embodiments, it is also contemplated to normalize dX and dY if the sum of the absolute values of dX and dY is greater than some number ranging from about zero (0) to about one-quarter (¼) of the range between the minimum and maximum pixel values.

A four bit key value is determined, in a step F, as a function of the normalized values of dX and dY. Because the normalized values of both dX and dY are in the range of −255 to +255, two's complement binary representations of the values of dX and dY require nine (9) bits. The first bit represents the sign of the value and the last eight (8) bits represent the numerical value. As is customary in two's complement notation, a sign bit of zero (0) indicates a positive number and a sign bit of one (1) indicates a negative number. The binary representations of dX and dY for the example shown in FIG. 7A are 100110101 and 011001010, respectively. The two (2) most significant bits of dX represent the two (2) most significant bits of the key number, while the two (2) most significant bits of dY represent the two (2) least significant bits of the key number. Therefore, for the example shown in FIG. 7A, the key value is 1001 (i.e., 9).

Because the key number is four (4) bits, its value ranges from zero (0) to 15. The key value indicates the locations and orientations of the two (2) colors (i.e., the type of edge) in the 3×3 sub-neighborhood. The orientations specify whether the edge 116 in FIG. 6 between the two (2) colors is horizontal, diagonal, or vertical. The locations of the two (2) colors specify which part of the 3×3 sub-neighborhood includes the first color c1, which is considered the "light" color, and which part includes the second color c3, which is considered the "dark" color.

A step G evaluates the key value for determining if the algorithm of the present invention is appropriate for scaling the edge 116. In the case where the key value equals 0, 3, 12, or 15 (i.e., 0000, 0011, 1100, or 1111, respectively), the two (2) highest order bits of dX are equal and the two highest order bits of dY are equal, which indicates that the values are close to zero (0). If the high order bits of both dX and dY are close to zero (0), the difference between the values at the two (2) top corners and two (2) bottom corners and the difference between the two (2) left corners and two (2) right corners of the 3×3 sub-neighborhood are close to zero (0). Consequently, it is assumed that there is no edge within the 3×3 sub-neighborhood. When there is no edge in the 3×3 sub-neighborhood, it is not appropriate to use the scaling up method of the present invention. Therefore, an alternate process may be used to scale up the POI $114_{3,3}$. For example, alternate algorithms are contemplated for scaling up the POI $114_{3,3}$ as a function of the nearest neighbors or linear interpolation, etc. After it is determined to use an alternate scaling up algorithm, control is passed to a step H to stop the present process 118 so that another scaling algorithm may be used; otherwise, control passes to a step I.

In the step I, two (2) pixel values are selected within the 3×3 sub-neighborhood, which represent the first and second color variables c1, c3, respectively, as a function of the key number. Furthermore, as discussed below, a value of a more distant pixel in the direction of the pixel used to determine the variable c1 is used to determine a variable c0. Similarly, a value of a more distant pixel in the direction of the pixel used to determine the variable c3 is used to determine a variable c4.

If the key number equals one (1) or 13 (i.e., 0001 or 1101, respectively, in binary), the two (2) bits of dX are equal and the two (2) bits of dY are "01". Such a key value is produced when a vertical edge passes through the 3×3 sub-neighborhood and the lighter color is on the left side of the edge while the darker color is on the right side of the edge. Therefore, the color on the left side of the edge (e.g., the color value of the pixel ML) is assigned to c1 and the color on the right side of the edge (e.g., the color value of the pixel MR) is assigned to c3. Furthermore, the color of the pixel $114_{3,1}$ is assigned to c0, and the color of the pixel $114_{3,5}$ is assigned to c4.

If the key number equals two (2) or 14 (i.e., 0010 or 1110, respectively, in binary), the two (2) bits of dX are equal and the two (2) bits of dY are "10". Such a key value is produced when a vertical edge passes through the 3×3 sub-neighborhood and the darker color is on the left side of the edge while the lighter color is on the right side of the edge. Therefore, the color on the right side of the edge (e.g., the color value of the pixel MR) is assigned to c1 and the color on the left side of the edge (e.g., the color value of the pixel ML) is assigned to c3. Furthermore, the color of the pixel $114_{3,5}$ is assigned to c0, and the color of the pixel $114_{3,1}$ is assigned to c4.

If the key number equals four (4) or seven (7) (i.e., 0100 or 0111, respectively, in binary), the two (2) bits of dX are "01" and the two (2) bits of dY are equal. Such a key value is produced when a horizontal edge passes through the 3×3 sub-neighborhood and the lighter color is above the edge while the darker color is below the edge. Therefore, the color above the edge (e.g., the color value of the pixel UC) is assigned to c1 and the color below the edge (e.g., the color value of the pixel LC) is assigned to c3. Furthermore, the color of the pixel $114_{1,3}$ is assigned to c0, and the color of the pixel $114_{5,3}$ is assigned to c4.

If the key number equals eight (8) or 11 (i.e., 1000 or 1011, respectively, in binary), the two (2) bits of dX are "10" and the two (2) bits of dY are equal. Such a key value is produced when a horizontal edge passes through the 3×3 sub-neighborhood and the darker color is above the edge while the lighter color is below the edge. Therefore, the color below the edge (e.g., the color value of the pixel LC) is assigned to c1 and the color above the edge (e.g., the color value of the pixel UC) is assigned to c3. Furthermore, the color of the pixel $114_{5,3}$ is assigned to c0, and the color of the pixel $114_{1,3}$ is assigned to c4.

If the key number equals five (5) (i.e., 0101 in binary), the two (2) bits of dX and the two (2) bits of dY are "01". Such a key value is produced when a diagonal edge passes through the 3×3 sub-neighborhood from the bottom left to the top right corners. Furthermore the lighter color is above the diagonal edge while the darker color is below the diagonal edge. Therefore, the color above the diagonal edge (e.g., the color value of the pixel UL) is assigned to c1 and the color below the diagonal edge (e.g., the color value of the pixel LR) is assigned to c3. Furthermore, the color of the pixel $114_{1,1}$ is assigned to c0, and the color of the pixel $114_{5,5}$ is assigned to c4.

If the key number equals ten (10) (i.e., 1010 in binary), it is assumed that a diagonal edge passes through the 3×3 sub-neighborhood from the bottom left to the top right corners. Furthermore the lighter color is below the diagonal edge while the darker color is above the diagonal edge. Therefore, the color below the diagonal edge (e.g., the color value of the pixel LR) is assigned to c1 and the color above the diagonal edge (e.g., the color value of the pixel UL) is assigned to c3. Furthermore, the color of the pixel $114_{5,5}$ is assigned to c0, and the color of the pixel $114_{1,1}$ is assigned to c4.

If the key number equals six (6) (i.e., 0110 in binary), it is assumed that a diagonal edge passes through the 3×3 sub-neighborhood from the bottom right to the top left corners. Furthermore the lighter color is above the diagonal edge while the darker color is below the diagonal edge. Therefore, the color above the diagonal edge (e.g., the color value of the pixel UR) is assigned to c1 and the color below the diagonal edge (e.g., the color value of the pixel LL) is assigned to c3. Furthermore, the color of the pixel $114_{1,5}$ is assigned to c0, and the color of the pixel $114_{5,1}$ is assigned to c4.

If the key number equals nine (9) (i.e., 1001 in binary), it is assumed that a diagonal edge passes through the 3×3 sub-neighborhood from the bottom right to the top left corners. Furthermore the lighter color is below the diagonal edge while the darker color is above the diagonal edge. Therefore, the color below the diagonal edge (i.e., the color value of the pixel LL) is assigned to c1 and the color above the diagonal edge (i.e., the color value of the pixel UR) is assigned to c3. Furthermore, the color of the pixel $114_{5,1}$ is assigned to c0, and the color of the pixel $114_{1,5}$ is assigned to c4.

In the example shown in FIG. 7A, the key number equals 1001 (i.e., 9). Therefore, in the step I, the value 100 is assigned to c1, the value 255 is assigned to c3, the value 100 is assigned to c0 and the value 255 is assigned to c4.

Furthermore, the value associated with the POI $114_{3,3}$ (e.g., 216 in the example described above) is assigned to a variable c2. Variables d1, d2 are calculated such that the value of d1=c2−c1 and the value of d2=equals c3−c2. In the example shown in FIG. 7A, d1 equals 116 and d2 equals 39.

The values of c0, c1, c2, c3, c4, d1, d2 are evaluated in a step J. More specifically, the values are tested to ensure that the exclusive-or of the binary expressions of d1 and d2 is greater than or equal to zero (0) and the value of c1 does not equal the value of c3 (i.e., if either c1>c2>c3 or c1<c2<c3).

Two (2) additional tests are performed in the step J to eliminate ramps from actual high contrast edges. First, the contrast between the light and dark colors c1, c3, respectively, must exceed about one-half of the dynamic range (i.e., 128 in the 8-bit system of the example). Second, the difference between c0 and c1 and the difference between c3 and c4 must both be small (e.g., less than about 1/64 of the dynamic range) or negative. Therefore, for a dynamic range of 128, the difference between c0 and c1 and the difference between c3 and c4 must both be less than about 2 (i.e., 128*(1/64)). These two (2) additional tests are satisfied in the example described above.

If the variables c0, c1, c2, c3, c4, d1, d2 satisfy the evaluations performed in the step J, control passes to a step K; otherwise, control passes to the step H to stop the current process 118, and alternatively use another scaling algorithm.

In the step K, a coverage of the color c3 in the primary 3×3 sub-neighborhood 120 is calculated as $COVERAGE_{c3} = d1 \div (d1+d2)$ (e.g., 74.8% in the above example). Similarly, a coverage of the color c1 in the primary 3×3 sub-neighborhood 120 is calculated in the step K as $COVERAGE_{c1} = d2 \div (d1+d2)$ (e.g., 25.2% in the above example).

For ease of illustrations, FIGS. 7B and 7C show additional views of the 5×5 neighborhood that highlight different pixels of interest and 3×3 neighborhoods. For ease of understanding these additional views, like components are designated by like numerals with a primed (') or double primed (").

With reference to FIGS. 7A–7C and 8, two secondary (additional) pixels of interest POI', POI", which represent centers of respective secondary (additional) 3×3 sub-neighborhoods 120', 120" completely contained within the 5×5 neighborhood 112', 112", are determined in a step L. Each of the additional pixels of interest POI', POI" represent pixels (besides the POI $114_{3,3}$) through which the edge is expected to pass. Then, two (2) additional 3×3 analyses are performed for the additional 3×3 neighborhoods 112', 112" in a step M. The additional 3×3 analyses improve the robustness of the decision that the edge passes through the POI $114_{3,3}$ and the choice of the color levels c1, c3. The preferred process for determining the additional pixels of interest POI', POI", which is used regardless of what type of edge is found, is described below.

For an edge between diagonal and vertical and passing through the upper, left portion of the sub-neighborhood 112 (as shown in FIG. 6), the edge either passes through the pixel above (e.g., $114_{2,3}$) the POI $114_{3,3}$ or the pixel above and to the left (e.g., $114_{2,2}$) of the POI $114_{3,3}$. The first additional 3×3 analysis assigns POI' to the pixel through which the edge passes. However, if the edge passes through both of the pixels $114_{2,3}$, $114_{2,2}$, either of the pixels $114_{2,3}$, $114_{2,2}$ may be used as the POI' for the 3×3 sub-neighborhood 112' in the first additional 3×3 analysis. Although FIG. 6 shows an edge passing from the lower, right to the upper, left of the sub-neighborhood 112, it is to be understood that the process described below may be used for edges having any orientation.

In the preferred embodiment, a variable "cov," which represents a coverage of the POI $114_{3,3}$ by the color c1, is calculated. From the geometry shown in FIG. 6, it is clear that the calculated coverage is not always a correct estimate for the point at which the edge crosses a horizontal midline 124, which extends from an origin 126 within the 3×3 sub-neighborhood 112 (the origin 126 is assumed to be midway up the window and along the left edge). However, the calculated coverage is a close enough estimate to use when selecting other pixels through which the edge 116 passes. The calculated coverage (cov) is determined as:

$$cov = \frac{(x_1 + x_2)}{2} - 1.$$

Since the slope of the edge 116 is $dY/dX = 1/(x_1 - x_0)$, and one point is known (i.e., x=cov+1, y=0), finding intersecting points $x_0$, $x_1$ is straightforward:

$$x_0 = cov + 1 - \frac{dX}{2dY}; \text{ and}$$

$$x_1 = cov + 1 + \frac{dX}{2dY}.$$

Then, the edge 116 is calculated to cross the 3×3 sub-neighborhood 120 at:

$$x_{top} = 2x_0 - x_1;$$

and $$x_{bottom} = 2x_1 - x_0.$$

POI' and POI" are determined as a function of $x_{top}$ and $x_{bottom}$. More specifically, if $x_{top} < 1$, POI' is the pixel $114_{2,2}$; otherwise, POI' is the pixel $114_{2,3}$. Furthermore, if $x_{bottom} > 2$, POI" is the pixel $114_{4,4}$; otherwise, POI" is the pixel $114_{4,3}$. It is to be understood that similar diagrams and expressions hold true for edges having other slopes and ranges.

In the example described above, cov=1/6; $x_0 = 53/404$; $x_1 = 1255/1212$; $x_{top} = -937/1212$; and $x_{bottom} = 2351/1212$. Therefore, because $x_{top} < 1$ and $x_{bottom} \leq 2$, the pixels $114_{2,2}$, $114_{4,3}$ are selected as POI', POI", respectively.

If horizontal or vertical edges are found, it may be relatively straightforward to determine which pixels within the primary sub-neighborhood will be used for POI', POI". Therefore, it is contemplated in an alternate embodiment that if a horizontal edge exists, the pixels $114_{3,1}$ and $114_{3,5}$ are used as respective pixels of interest POI', POI" in the respective additional 3×3 analyses. Similarly, if it is determined that a vertical edge exists, the pixels $114_{2,3}$ and $114_{4,3}$ are used as the pixels of interest POI', POI" in the respective additional 3×3 analyses. If, on the other hand, a diagonal edge exists, the respective pixels of interest POI', POI" to be used in the additional 3×3 analyses are not clearly identified. Therefore, the process described below for the preferred embodiment would be used.

With reference again to FIGS. 7A–7C, a key number of 1001 (i.e., 9) is calculated for the sub-neighborhood 112" used for the first additional 3×3 analysis. Therefore, the diagonal edge is found to exist in the POI' $114_{2,2}$. Furthermore, it is determined that the edge extends from the bottom, right to the top, left corners of the sub-neighborhood 112'. A lighter color c1' of 100 is calculated to cover 60% of the POI' $114_{2,2}$ below the diagonal edge; also, a darker color c3' is calculated to cover 40% of the POI' $114_{2,2}$ above the diagonal edge.

According to the calculations performed above, a key number of 1001 (i.e., 9) is calculated for the sub-neighborhood 112" used for the second additional 3×3 analysis. Therefore, the diagonal edge is found to exist in the POI" $114_{4,3}$. A color c1" of 100 is calculated to cover 75% of the POI" $114_{4,3}$ below the diagonal edge; also, a color c3" is calculated to cover 25% of the POI" $114_{4,3}$ above the diagonal edge.

With reference again to FIG. 5, a normalization look-up table, which is stored in the memory 102, is preferably indexed with six (6) bits for each dX and dY. In this manner, the look-up table includes four (4) bit normalized values for each dX and dY. Consequently, the look-up table stores about 4,096 bytes of information (one for each value of the combinations of dX and dY).

With reference again to FIGS. 7A–7C and 8, a determination is made in a step N if the edge exists in a predetermined number (e.g., at least one (1)) of the additional pixels of interest POI', POI" (e.g., a majority of the pixels of interest POI, POI', POI"). If the edge does exist in at least one (1) of POI', POI", control passes to a step O; otherwise, it is assumed that the edge detected in the POI $114_{3,3}$ is merely noise, and, control passes to the step H for stopping the process.

Corrected values of the variables c1, c3 are calculated in the step O. More specifically, if the edge is found to pass through the predetermined number of the pixels of interest POI', POI", $c1_{Corrected}$, $c3_{Corrected}$ are calculated as the respective averages of the two values of c1, c3. Similarly, if the edge is found to pass through both of the pixels of interest POI', POI", $c1_{Corrected}$ $c3_{Corrected}$ are calculated as the respective averages of the three values of c1, c3. In the example described above, the edge is found to pass through both POI' and POI". Therefore, $c1_{Corrected}$ and $c3_{Corrected}$ are calculated as:

$$c1_{corrected} = \frac{c1 + c1' + c1''}{3} = \frac{100 + 100 + 100}{3} = 100; \text{ and}$$

$$c3_{corrected} = \frac{c3 + c3' + c3''}{3} = \frac{255 + 255 + 255}{3} = 255.$$

Then, corrected values $d1_{corrected}$, $d2_{corrected}$ are calculated as: $d1_{corrected} = c2_{corrected} - c1_{corrected}$ and $d2_{corrected} = c3_{corrected} - c2_{corrected}$. Similarly, corrected values of the coverages $COVERAGE_{c3\ (corrected)}$ and $COVERAGE_{c1\ (corrected)}$ are calculated as a function of the corrected values $d1_{corrected}$, $d2_{corrected}$. In the example described above, there is no difference between the corrected and original values.

Because the edge signals may have been generated by thin strokes in the 5×5 neighborhood 112, a thin stroke test is performed in a step P for the POI $114_{3,3}$.

Thin strokes include light or dark areas between one and two pixels wide. It is assumed that a thin stroke is a white (or black) stroke on a black (or white) background. It is almost impossible to distinguish thin strokes having a black and white contrast to slightly wider strokes having slightly less contrast. Furthermore, there is little difference between the printed appearances of black/white thin strokes and the slightly wider strokes of less contrast.

Assuming the POI $114_{3,3}$ contains part of a thin stroke, the computed coverages are likely incorrect (because the coverages were computed based on the two neighboring colors rather than black and white). In order for a pixel to be a part of a thin stroke, 1) one of the neighboring pixels to the POI $114_{3,3}$ must be substantially black or substantially white (i.e., substantially dark or substantially light), and 2) one of the neighboring pixels to the POI $114_{3,3}$ perpendicular to the edge (e.g., to the left and right of the POI for a vertical stroke; or above and below the POI for a horizontal stroke) must signal an edge of the opposite color (e.g., black or white).

If a thin stroke is detected in the step P, control passes to the step H; otherwise, control passes to a step Q for determining whether to process the pixel at a later time.

In an alternative embodiment, the analysis steps A through P merely determine whether or not an edge is present, and the approximate orientation of the edge. One or more tag bits are associated with the pixel to communicate this information to later processing. If an edge is present (i.e., if a thin stroke is not found in the step P), control passes to the step Q for determining how to process the pixel at a later time. If it is determined in the step Q to process the pixel as an edge, the one or more tag bits, which indicate whether an edge is present (along with its orientation), are set appropriately, in a step R, for later processing by, for example, a Hyperacuity process or Tagged Antialiased Rendering. For example, three tag bits might be used, with a value of the first tag bit being 0 for no edge, and 1 for an edge, and the remaining two bits indicating the approximate orientation of the edge. It is to be understood that the values of the tag bits are easily determined from the information derived in the analysis of the steps A through P. After the step R, control passes to the step H for stopping the process. If, on the other hand, it is determined in the step Q to process the pixel as a smooth region, the tag bits are set accordingly.

The POI $114_{3,3}$ is scaled up by determining a variable BUFFER. The variable BUFFER is retrieved from a scaling look-up table as a function of the values of dX, dY, $COVERAGE_{c3\ (corrected)}$, and $COVERAGE_{c1\ (corrected)}$. The variable BUFFER is effectively a three-dimensional lookup table that provides patterns indicating which subpixels are on which side of the edge 116, and includes a matrix of values for defining a block of Y scanlines of X scaled up pixels for representing the scaled up POI $114_{3,3}$. The colors $c1_{corrected}$, $c3_{corrected}$ are assigned to the block of X by Y scaled up pixels in the POI $114_{3,3}$ according to the variable BUFFER. A parametric equation of the edge is given by (X, Y)=$(X_0, Y_0)$+t* (dX, dY), for some point $(X_0, Y_0)$. The values of $COVERAGE_{c3\ (corrected)}$, and $COVERAGE_{c1\ (corrected)}$, along with dX and dY, completely determine $X_0$ and $Y_0$.

In the preferred embodiment, the matrix of BUFFER values only includes ones and zeros. For example, if it is determined that a horizontal edge passes through the POI $114_{3,3}$, the matrix of BUFFER values assigns the scaled up pixels above the edge a value of one (1) and the scaled up pixels below the edge a value of zero (0). Then, the value within the BUFFER matrix corresponding to the scaled up pixel within the POI $114_{3,3}$ is multiplied by $\{c1_{corrected} + ((c3_{corrected} - c1_{corrected})*\text{BUFFER}[\text{Index}]\}$, where Index is a counter variable. If, as in the preferred embodiment, the values within the BUFFER matrix only include ones and zeros, the scaled up pixels will only be assigned the values of $c1_{corrected}$ or $c3_{corrected}$. In this case, logical operations may replace the multiplications.

FIG. 9 illustrates a scaled up pixel of interest POI $114_{3,3}$. In the preferred embodiment, the POI is scaled up four (4) times in the horizontal direction and four (4) times in the vertical direction. In this manner, the scaled up pixel $114_{3,3}$ includes sixteen subpixels 150. Four (4) of the subpixels $150_{2,1}$, $150_{3,1}$, $150_{4,1}$, $150_{4,2}$ are assigned the value of corrected (i.e., 100) while the remaining twelve subpixels $150_{1,1}$, $150_{1,2}$, $150_{1,3}$, $150_{1,4}$, $150_{2,2}$, $150_{2,3}$, $150_{2,4}$, $150_{3,2}$, $150_{3,3}$, $150_{3,4}$, $150_{4,3}$, $150_{4,4}$ are assigned the value of $c3_{corrected}$ (i.e., 255). Although the preferred embodiment discloses a scaled up pixel having sixteen subpixels, it is to be understood that other embodiments, having different numbers of subpixels, are also contemplated.

In an alternate embodiment, the BUFFER matrix includes zeros, ones, and fractional values between zero (0) and one (1). Therefore, the scaled up pixels are assigned values in the range of $c1_{corrected}$ to $c3_{corrected}$.

The scale factors in X and in Y determine the size of the look-up table. Specifically, the size of the look-up table is $X*Y*2^{2o+c}$ where o and c are the number of bits of orientation and coverage, respectively. In an alternate embodiment, the orientation is derived from dX and dY. In that embodiment, it is also contemplated to use a look-up table for determining the orientation).

If three (3) bits are used for both the orientation and coverage, for printing 600 dpi by 4,800 dpi from a 300 dpi by 300 dpi input, the values of X and Y are 16 and 2, respectively. Therefore, the total table size is $16*2*2^{2(3)+3}=$ about 16 kilobytes. It is contemplated that the multiplication be performed as an eight (8) bit number (for c3–c1) times a four (4) bit number (for BUFFER[index]), thereby reducing the shift to three (3) bits. In this case, the multiplication is optionally done using a table look-up of 4 kilobytes.

It is to be understood that after the scaling up process is completed, the POI $114_{3,3}$ is halftoned before it is printed using the output device, unless the output device accepts continuous tone data, such as is the case for many soft-copy devices.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for rendering an image, comprising:
   a memory for storing display data associated with a primary neighborhood of pixels within the image; and
   a processor, communicating with the memory, for assigning tags to a pixel of interest within the primary neighborhood as a function of a plurality of edge detection analyses performed on the display data in respective sub-neighborhoods within the primary neighborhood, each of the sub-neighborhoods including the pixel of interest, wherein the tags identify whether an edge, along with an associated orientation of the edge, is present within the pixel of interest.

2. The apparatus as set forth in claim 1, further including:
   an output device, communicating with the processor, for displaying the pixel of interest.

3. The apparatus as set forth in claim 2, wherein the output device is a color printing device.

4. An apparatus for scaling up an input image including:
   a memory for storing display data associated with a pixel of interest and a primary neighborhood of pixels which surround the pixel of interest; and
   a processor for (a) performing edge detection analyses on the display data in respective sub-neighborhoods within the primary neighborhood, each of the sub-neighborhoods including the pixel of interest, (b) for assigning tags to the pixel of interest as a function of the edge detection analyses, and (c) scaling up the pixel of interest within the primary neighborhood if a majority of the edge detection analyses determines that an edge is included within the respective sub-neighborhoods.

5. The apparatus for scaling up an input image as set forth in claim 4, wherein the processor determines respective edge types in the sub-neighborhoods.

6. The apparatus for scaling up an input image as set forth in claim 5, wherein scaled up display data for the pixel of interest is calculated as a function of the display data associated with the sub-neighborhoods including the edge.

7. The apparatus for scaling up an input image as set forth in claim 6, wherein the scaled up display data for the pixel of interest is calculated as a function of a slope of the edge within the sub-neighborhood including the pixel of interest.

8. The apparatus for scaling up an input image as set forth in claim 6, wherein colors of the scaled up display data are determined as a function of colors within the sub-neighborhoods including the edge.

9. The apparatus for scaling up an input image as set forth in claim 4, wherein:
   the primary neighborhood is a 5×5 neighborhood of pixels;
   each of the sub-neighborhoods is a 3×3 neighborhood of pixels; and
   the processor performs 3 edge detection analyses.

10. The apparatus for scaling up an input image as set forth in claim 4, wherein the tags identify whether an edge, along with an associated orientation of the edge, is present within the pixel of interest.

11. A method for producing an image, comprising:
    selecting a neighborhood and a primary sub-neighborhood of pixels;
    determining if an edge exists within a primary pixel of interest in the primary sub-neighborhood;
    if the edge exists in the primary pixel of interest, determining at least one additional sub-neighborhood, including a respective additional pixel of interest, within the neighborhood of pixels;
    determining if the edge exists in a majority of the pixels of interest in the at least one additional sub-neighborhood, which includes the primary pixel of interest; and
    if the edge exists in the majority of the pixels of interest in the primary and the at least one additional sub-neighborhood, assigning tags, representative of the edge, to the primary pixel of interest.

12. The method for producing an image as set forth in claim 11, further including:
    if the edge exists in the majority of the pixels of interest in the primary and the at least one additional sub-neighborhood, determining an edge type and an edge orientation, the tags identifying the edge type and the edge orientation.

13. The method for producing an image as set forth in claim 11, further including:
    scaling up the pixel of interest as a function of the tags; and
    outputting the scaled up primary pixel of interest.

14. The method for producing an image as set forth in claim 13, wherein the step of scaling up includes:
    determining scaled up image data associated with the primary pixel of interest as a function of image data associated with the majority of the pixels of interest in the primary and the at least one additional sub-neighborhood.

15. The method for producing an image as set forth in claim 14, wherein the step of determining scaled up image data includes:
    determining colors defining the edge in the primary pixel of interest as a function of colors defining the respective edges in the majority of the pixels of interest in the primary and the at least one additional sub-neighborhood.

16. The method for producing an image as set forth in claim 13, wherein the step of outputting includes:
    outputting the primary pixel of interest to a color printing device.

17. The method for producing an image as set forth in claim 11, wherein the steps of selecting a neighborhood and determining at least one additional sub-neighborhood include:

identifying a neighborhood including at least twenty-five pixels and sub-neighborhoods including at least nine pixels.

18. A method of processing a primary pixel of interest within an image, comprising:

receiving colors, defining a plurality of pixels in a primary sub-neighborhood of pixels included within a neighborhood of pixels, into a processor, the primary pixel of interest being included within the primary sub-neighborhood;

determining if a border exists between first and second regions within the primary pixel of interest;

if the border exists within the primary pixel of interest, determining a plurality of secondary sub-neighborhoods of pixels, included within the neighborhood, that potentially include the border;

determining if the border exists between the first and the second regions within respective secondary pixels of interest in the secondary sub-neighborhoods;

if the border exists within a predetermined number of the pixels of interest, identifying respective amounts of coverage for first and second colors within a plurality of scaled up pixels corresponding to the primary pixel of interest; and displaying the scaled up pixels.

19. The method of processing a primary pixel of interest within an image as set forth in claim 18, wherein the steps of determining if a border exists include:

determining first and second color gradients, in first and second directions within the respective sub-neighborhoods of pixels; and determining if the border exists within the respective sub-neighborhood of pixels as a function of the first and second color gradients.

20. The method of processing a primary pixel of interest within an image as set forth in claim 19, wherein the steps of determining if a border exists within the pixels of interest include:

determining respective key numbers associated with the sub-neighborhoods as a function of the respective first and second color gradients.

21. The method of processing a pixel of interest within an image as set forth in claim 20, further including:

determining the first and second colors as a function of colors included within the pixels of interest including the border.

* * * * *